US007158918B2

(12) United States Patent
Bunn et al.

(10) Patent No.: US 7,158,918 B2

(45) Date of Patent: Jan. 2, 2007

(54) MACHINE PERFORMANCE MONITORING SYSTEM AND BILLING METHOD

(75) Inventors: Arthur H. Bunn, Springfield, IL (US); John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 3 days.

(21) Appl. No.: 10/168,770

(22) PCT Filed: Sep. 10, 2001

(86) PCT No.: PCT/US01/28227

§ 371 (c)(1), (2), (4) Date: May 29, 2003

(87) PCT Pub. No.: WO02/23735

PCT Pub. Date: Mar. 21, 2002

(65) Prior Publication Data

US 2004/0015305 A1 Jan. 22, 2004

Related U.S. Application Data

(60) Provisional application No. 60/231,762, filed on Sep. 12, 2000.

(51) Int. Cl.
*G06F 3/02* (2006.01)

(52) U.S. Cl. ...................... 702/182; 702/179; 702/183; 702/188

(58) Field of Classification Search .................. 702/25, 702/50, 64, 100, 173, 177, 182, 20, 179, 702/183; 99/280, 290; 426/392; 705/1; 73/53.02

See application file for complete search history.

(56) References Cited

U.S. PATENT DOCUMENTS

| | | | | |
|---|---|---|---|---|
| 3,927,800 | A | 12/1975 | Zinsmeyer et al. | 222/26 |
| 4,237,536 | A | 12/1980 | Enelow et al. | 365/465 |
| 4,265,371 | A | 5/1981 | Desai et al. | 222/70 |
| 4,295,044 | A | 10/1981 | Anderson et al. | 250/229 |
| 4,412,292 | A | 10/1983 | Sedam et al. | 364/479 |
| 4,484,515 | A | 11/1984 | Illy | 99/282 |
| 4,531,046 | A | 7/1985 | Stover | 219/297 |
| 4,821,921 | A | 4/1989 | Cartwright et al. | 222/65 |
| 4,827,426 | A | 5/1989 | Patton et al. | 364/479 |
| 5,094,153 | A * | 3/1992 | Helbling | 99/280 |
| 5,203,366 | A * | 4/1993 | Czeck et al. | 137/3 |

(Continued)

FOREIGN PATENT DOCUMENTS

EP 0 922 425 A1 12/1997

(Continued)

*Primary Examiner*—Marc S. Hoff
*Assistant Examiner*—Felix Suarez
(74) *Attorney, Agent, or Firm*—Barnes & Thornburg LLP

(57) ABSTRACT

A system for monitoring the performance of beverage preparation equipment includes a device, such as a data collector, for monitoring the use of the equipment. Information regarding one or more inputs to the equipment is provided to the data collector which uses the information to monitor the performance of the equipment. The information may include information relating to voltage, current, phase angle, and time. The information may be used by a supplier to time delivery of product to the end user of the apparatus or servicing of the equipment in response to use, inferred information, and other alerts. A method of billing based on the results of the monitoring includes a method of billing the use of the apparatus and product in relation to the quantity of water, product, or both used by the apparatus.

48 Claims, 4 Drawing Sheets

U.S. PATENT DOCUMENTS

| | | | | | |
|---|---|---|---|---|---|
| 5,339,250 | A | | 8/1994 | Durbin | 364/479 |
| 5,360,140 | A | | 11/1994 | Senghaas | 222/52 |
| 5,546,444 | A | | 8/1996 | Roach, Jr. et al. | 379/59 |
| 5,590,999 | A | | 1/1997 | Murphey | 414/795.6 |
| 5,769,271 | A | | 6/1998 | Miller | 222/1 |
| 5,844,808 | A | | 12/1998 | Konsmo et al. | 364/479.14 |
| 5,875,430 | A | | 2/1999 | Koether | 705/1 |
| 5,963,452 | A | | 10/1999 | Etoh et al. | 364/479.06 |
| 6,036,055 | A | | 3/2000 | Mogadam et al. | 222/23 |
| 6,092,693 | A | | 7/2000 | Powell | 222/59 |
| 6,127,185 | A | * | 10/2000 | Melton et al. | 436/60 |
| 6,155,158 | A | * | 12/2000 | Anson | 99/280 |
| 6,182,555 | B1 | * | 2/2001 | Scheer et al. | 99/290 |
| 6,192,737 | B1 | * | 2/2001 | Ohlrogge et al. | 73/19.06 |
| 6,305,268 | B1 | | 10/2001 | Schamberg et al. | 99/283 |
| 6,600,969 | B1 | * | 7/2003 | Sudolcan et al. | 700/237 |
| 2002/0122844 | A1 | * | 9/2002 | Cooke et al. | 426/34 |

FOREIGN PATENT DOCUMENTS

| | | | |
|---|---|---|---|
| WO | WO 02/23735 | A2 | 3/2002 |
| WO | PCT/US01/28227 | | 4/2002 |

* cited by examiner

MACHINE PERFORMANCE MONITORING SYSTEM AND BILLING METHOD

RELATED APPLICATION

This application claims the priority of U.S. Provisional Patent Application No. 60/231,762 filed on Sep. 12, 2000, the complete disclosure of which is hereby expressly incorporated by reference.

FIELD OF THE INVENTION

This invention relates generally to food preparation equipment, and more specifically to food preparation equipment having monitoring capabilities.

BACKGROUND OF THE INVENTION

By way of background, a variety of food preparation apparatus are available in which a product, such as a food concentrate or food base, is combined or otherwise mixed with water or another liquid. In this regard, most beverages, as well as other liquid food substances, such as soups, are not ready to drink and are prepared by mixing water, either hot or cold, with such a product. For example, there are numerous devices which combine powdered or liquid concentrate coffee products with water to produce a reconstituted or mixed coffee beverage having a desired flavor. Similarly, some fountain-type beverage devices may be capable of dispensing carbonated beverages, as well as juice or other non-carbonated beverages, by mixing a syrup or powdered beverage product with carbonated or non-carbonated water to produce a diluted or reconstituted beverage.

One method of operation in the area of beverage preparation equipment and product sales is for the beverage equipment supplier or the product supplier to provide or loan the end user with the beverage preparation equipment at little or no cost by way of a no cost or low cost loan arrangement. In this scenario, the supplier retains ownership of the equipment. The supplier sells the product used with the loaned equipment at a higher price than the price solely for the product if the user owned the equipment. This allows the supplier to recover costs associated with the loaned equipment over a period of time through the higher priced product. In other words, this involves loaning the equipment to the end user with the agreement that the end user will purchase its product requirements from the supplier. The scenario typically requires that the equipment supplier maintain ownership and control of the equipment so that it can be transferred back to the equipment supplier in the event that the end other circumstances which require return of the equipment to the supplier.

One of the problems for the equipment supplier is that another company's product or concentrate could be purchased by the end user for use in the equipment supplier's equipment. Such a situation occurs and often results in a considerable loss of revenue for the supplier. Moreover, such switching of the product or concentrate by the end user can occur without the knowledge of the equipment supplier.

The equipment provider may be an equipment manufacturer, as well as another party, such as the producer or supplier of the product concentrate. Examples of end users are restaurants, convenience stores, hotels, motels, stadiums and other entertainment facilities, health care facilities, and other large institutional settings. Moreover, it should be noted that many of these types of end users may be members of a franchise arrangement which makes it difficult, if not impossible, in many situations to precisely monitor the type of concentrate being used in the equipment. With this in mind, the equipment supplier is left to trust or explicitly contract with the end user to avoid the end user from switching to an alternative, perhaps cheaper cost and lower quality concentrate product. Moreover, if the situation is managed by contract, the equipment supplier must be prepared to enforce the contract in the event of a switch in concentrate by the end user, which could damage or terminate the relationship.

As an additional concern, the equipment supplier often wishes to maintain a particular quality associated with the beverage equipment. In this regard, a well recognized, high-end equipment manufacturer would prefer to have some ability to control, if not assure, the quality of the beverages produced by its equipment. This oftentimes directly relates to the quality of the product concentrate used in the equipment. As such, if a cheaper, less expensive, and lower quality product is used in the equipment, a poor resultant product could impact negatively on the image and reputation of the equipment manufacturer.

Because the equipment supplier maintains ownership of the equipment, and incoming revenue is dependent on the use of the equipment, it is important to the equipment supplier that the equipment remain operable at the site of the end user. For example, it is important to discover any malfunctions in the equipment as early as possible. This helps to facilitate quickly correcting problems to minimize the amount of downtime, and prevent the machine from possibly becoming permanently damaged. It is also desirable to preventatively maintain the equipment to minimize downtime to maintain and further develop the manufacturer's reputation for quality equipment.

Unfortunately, because the equipment is with the end user, the equipment supplier typically does not become aware of problems with the equipment until the end user informs the equipment supplier. As such, by the time the end user informs the supplier, the equipment supplier may have already lost some revenue as a result of some downtime. In the intervening time the equipment may have become permanently damaged. Because the equipment is owned by the equipment supplier, if the machine is permanently damaged, the equipment supplier must replace the machine in order to continue receiving revenue and/or fulfill its contractual obligations to the user.

With the foregoing in mind, an aspect of the present invention seeks to provide a system for monitoring the performance and/or components of a machine. The present invention also provides a system of billing based on the monitoring of the machine.

SUMMARY OF THE INVENTION

The present invention provides a system, apparatus and method for monitoring the performance of beverage preparation equipment. In one embodiment, the system includes a device, such as a data collector, for monitoring the use of the beverage preparation equipment. Specifically, information regarding one or more inputs to the equipment is provided to the data collector, and the data collector uses the information to monitor the performance of the equipment. The information which is provided to the data collector regarding the one or more inputs to the equipment may include information relating to voltage, current, phase angle and/or time.

The present invention also provides a system, apparatus and method of billing based on the results of the monitoring.

In one embodiment, the method includes a method of billing the use of the apparatus and product in relation to the quantity of water, product, or both used by the apparatus. The information received by the data collector may be used by a supplier to time delivery of product or equipment to the end user of the apparatus.

The present invention provides of a method of monitoring a food preparation device. In one embodiment, the monitoring method comprises the steps of measuring 5 at least one input into the food preparation device; and determining information about the performance of the device based on the measured input.

In another embodiment of the monitoring method, the step of determining information includes determining an estimate of the volume of dilution material used by the device. The measured input is at least one of voltage, current, phase angle, and time.

In yet another embodiment of the monitoring method, the measured input is a volume of water used by the device.

In still another embodiment, the monitoring method further comprises a step of transmitting the measured input to a remote location prior to the step of determining information.

In yet still another embodiment of the monitoring method, the step of determining information includes determining a usage pattern.

In yet another embodiment, the monitoring measure further comprises the step of billing the user of the device based on the determined information.

The present invention further provides a system for monitoring the performance of food preparation equipment. In one embodiment, the system comprises a sensor for measuring at least one input to the food preparation equipment, a data collector, and means for transmitting the measured input to the data collector.

The data collector determines information regarding the performance of the food preparation equipment using the measured data.

In another embodiment, the system further provides means for providing access to the performance information to at least one supplier associated with the food preparation equipment.

In yet another embodiment of the system, the equipment uses a dilution material and the data collector determines an estimate of the volume of dilution material used by the equipment. The input to the equipment is electrical power and the sensor measures at least one of voltage, current, phase, and time of the power into the equipment.

In still another embodiment of the system; the input to the equipment is dilution material and the sensor measures the volume of water used by the equipment.

The present invention yet further provides a food preparation apparatus. In one embodiment, the apparatus comprises at least one dilution source providing a dilution material, at least one product source providing a product, at least one sensor providing information regarding at least one of the dilution material and the product, a controller connected to the sensor and configured to transmit the data externally of the apparatus, and a data collector externally receiving the data transmitted by the controller and determining performance information of the apparatus based on the data.

In another embodiment of the apparatus, the sensor is a device to measure the amount of product dispensed.

In yet another embodiment of the apparatus, at least one of the dilution source and product source includes a flow meter.

In still another embodiment of the apparatus, the data collector includes a communication device to transmit the performance information to a supplier.

The present invention still further provides a method of operating food preparation equipment. In one embodiment, the method comprises the steps of providing food preparation equipment to an end user, the food preparation equipment having a sensor; continuously monitoring data from the sensor; determining information about the performance of the food preparation equipment using the data from the sensor; and performing a function related to the equipment based on the information from the food preparation equipment.

In another embodiments of the method, the step of performing a function includes billing the end user, maintaining the equipment, and/or providing additional product to the end user.

In yet another embodiment of the method, the food preparation equipment includes a dilution source and the step of determining information includes determining the amount of dilution material used by the equipment.

In still another embodiment of the method, the food preparation equipment includes a product source having product and the step of determining information includes determining the amount of product used by the equipment.

In another embodiment of the method, the food preparation equipment includes a dilution source having dilution material, a heater, and a thermostat. The sensor measures the voltage at and the current through the heater. The thermostat measures the temperature of the dilution material. The step of determining information includes determining an estimate of the volume of dilution material used by the equipment.

In yet still another embodiment, the method further comprises the step of transmitting the information to at least one supplier of goods for the equipment.

Other features of the present invention will become apparent upon consideration of the following description of exemplary embodiments and the accompanying drawings.

BRIEF DESCRIPTION OF THE DRAWINGS

The present invention and the advantages thereof will become more apparent upon consideration of the following detailed description when taken in conjunction with the accompanying drawings of which.

Figure 1:
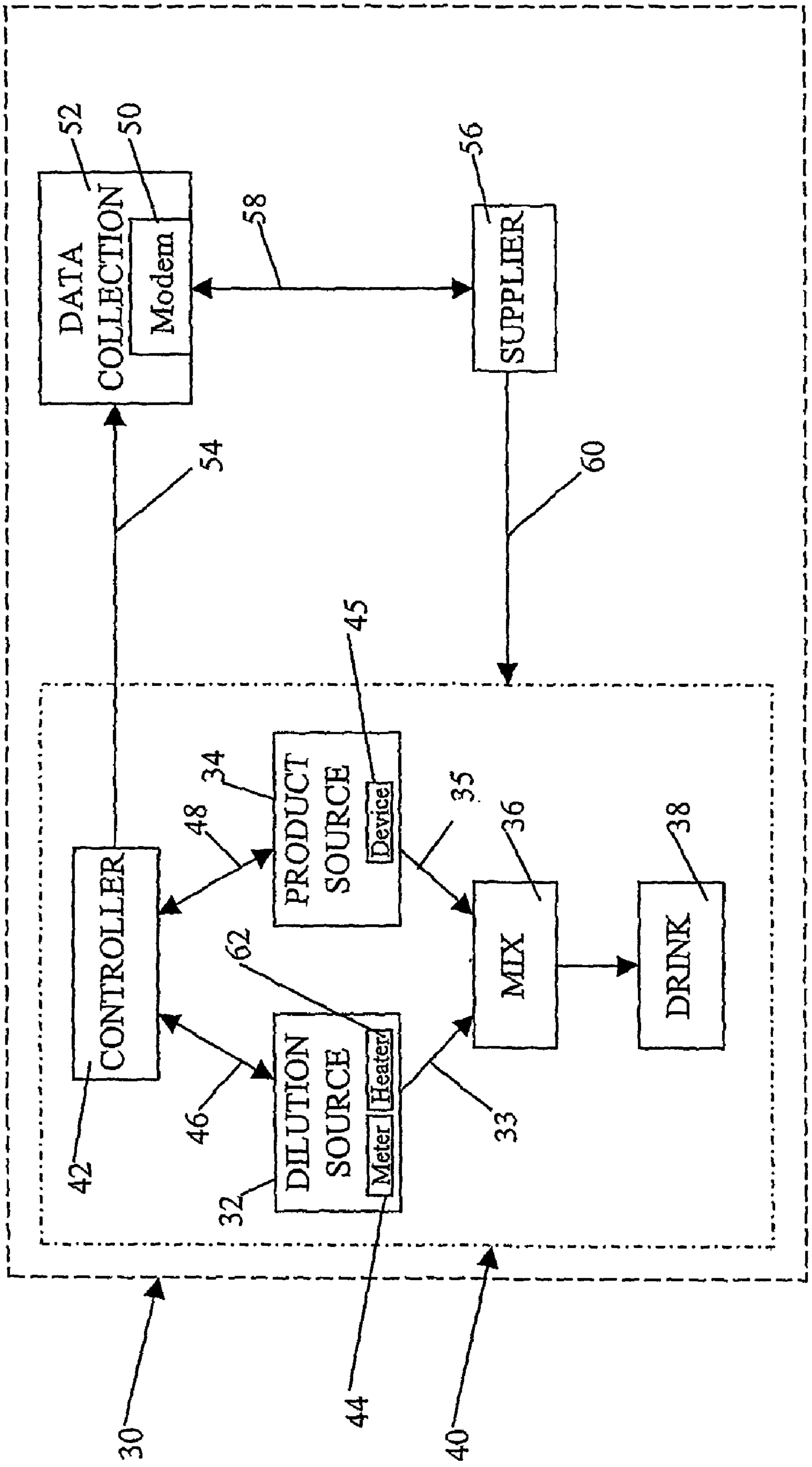
FIG. 1 is a diagrammatic illustration of a system, wherein an apparatus communicates information regarding dilution material and/or product used by the apparatus to a data collector or data collection portion.

These exemplifications set out herein illustrate embodiments of the invention that are not to be construed as limiting the scope of the invention in any manner.

DESCRIPTION OF EMBODIMENTS OF THE INVENTION

While the present invention may be susceptible to embodiment in different forms, there is shown in the drawings, and herein will be described in detail, embodiments thereof with the understanding that the present description is to be considered an exemplification of the principles of the invention, and is not intended to limit the invention to that as illustrated and described herein. The present application is based on and claims priority of U.S. Provisional Application No. 60/231,762 filed Sep. 12, 2000, the complete disclosure of which is hereby expressly incorporated by reference.

With reference to FIG. 1, an embodiment of the present invention provides a system 30, and a method which uses the system 30 which includes a dilution source 32 and a product source 34. The dilution source 32 primarily provides dilution material 33 or water to the system 30, and the product source 34 provides beverage product 35 to the system 30. However, it should be noted that the dilution material may be water, as well as any number of other dilution materials. For example, while water primarily will be used as a dilution material in beverage or food product preparation, as described below, it is anticipated that other dilution materials, such as milk, carbonated water, and other beverage or food bases, might be used. Moreover, the devices used to dispense dilution material could be any one of a variety of pumps, controllable valves, or other controllable dispensing devices. Reference hereinbelow will be made to dispensing water with the understanding that the term "dilution source" is to be broadly defined.

Figure 4:
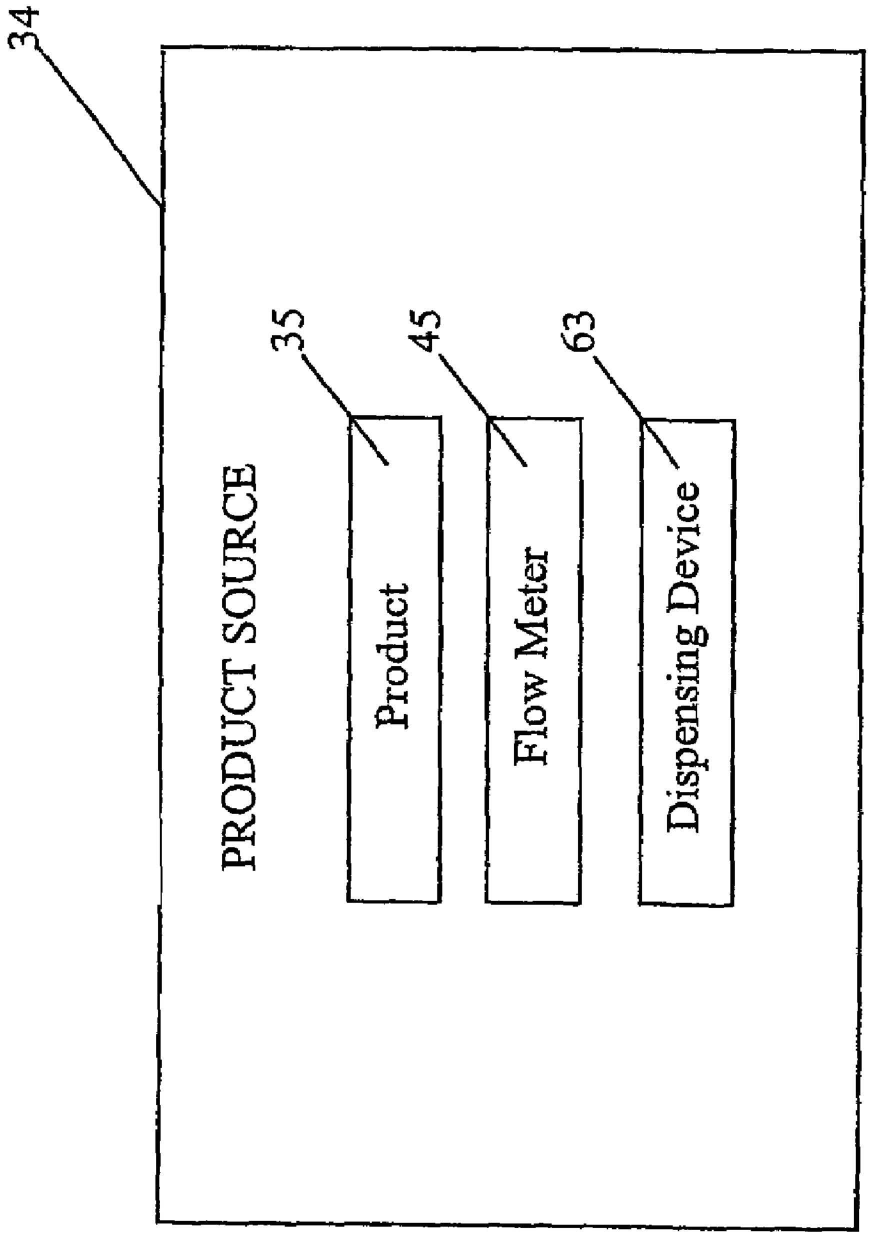
FIG. 4 is a diagrammatic illustration of the product source of FIG. 1.

Similarly, the product source 34 is considered to be broadly defined and interpreted, and includes any number of products 35. The products 35 are primarily concentrated or reduced forms of the beverages, drinks, or other food products which, when combined or mixed 36 with water dispensed from the dilution source 32 at a predetermined specific ratio, form a properly prepared resultant combination 38, referred to herein as a drink or beverage. The product source 34 may dispense any number of products, such as juice concentrates, soda syrups, ground coffee, tea leaves, powdered concentrates, such as coffee, tea, juices, soups, and other beverages or food products. Moreover, the devices 63 (FIG. 4) used to dispense product could be any one of a variety of pumps, auger dispensers, gravity feed dispensers, or other controllable dispensing devices. Reference hereinbelow to the term "product source" is to be broadly defined and interpreted.

The dilution source 32 and product source 34 are part of an apparatus 40 which includes a controller 42 to controllably dispense desired predetermined quantities of the dilution material 33 to be mixed 36 with product 35 to form the drink 38. The controller 42 may also be configured to control the product source 34, or the product source 34 may instead be configured to be batched by an operator. As shown in FIG. 1, the mixing step and/or apparatus 36 combines dilution material 33 and product 35. In the form of a step, the water is mixed with the product to produce the drink. As an apparatus, the mixer 36 may controllably combine the dilution material and product, such as by means of a motorized whipping device or other agitating device.

Consistent with the broad definitions provided hereinabove with regard to the dilution material and product, the drink may take the form of a finished, mixed, combined food product, such as a coffee beverage, soup, carbonated beverage or juice. In general, the drink is a food product which results from the mixing of the two components of which at least the dilution material 33 is generally a liquid. In order to further illustrate the broad definitions used herein, it is anticipated that the dilution source 32 may provide dilution material 33 in many forms ranging from a near freezing or freezing state, such as a slush material, to a vaporous or nearly-vaporous state, such as steam, in order to produce the desired drink 38.

As will be described in greater detail hereinbelow, in one embodiment, the dilution source 32 includes a device, such as a flow meter 44, which controls the flow of the dilution water 33. As will be discussed in greater detail hereinbelow, in another embodiment, the product source 34 includes a device such as a flow meter, sensor or other device 45 which is being monitored to directly or inferentially calculate the flow of product 35. As shown in FIG. 1, the system 30 includes the controller 42, and the controller 42 can be configured to control the product source 34 over line 48. The device 45 provides information to the controller 42 over line 48.

In either of the foregoing embodiments, lines 46 and 48 may be multiple line conductors or single line conductors, such conductors being of an electrically or optically conductive media, as well as wireless connections in such case lines 46 and 48 showing communication paths and not physical connection. The controller 42 and data collection portion 52 may be equipped with appropriate communication devices 50 such as a modem or global positioning and communication device to permit communication of information from the controller 42 to the data collection portion 52 regardless of the location of the apparatus 40. The definitions of the controller, data collection portion, communication paths and communication devices are to be broadly defined and interpreted.

The flow control device including the flow monitor may be positioned in various locations to achieve a desired result. For example, a single flow meter 44 can be placed at the inlet to the entire apparatus 40 so that the total water usage by the apparatus is monitored and reported to the controller 42. Alternatively, the flow meter can be placed at the dispensing outlet of a heated water reservoir which leads to a brewing system so that only the water used to brew is monitored. In the previous example, some brewing systems may include separate dispensing spigots for dispensing hot water only and, thus, would not be included in the calculation of the cost, described hereinbelow, relating to the present invention.

Furthermore, multiple flow meters can be placed relative to individual dispensing heads of a multiple dispensing apparatus 40 to record the amount and type dispensed from each head. It should be noted that the flow meter can be used on a pressurized water line, as well as a line in a gravity feed, pour-in basin system. With this in mind, the water meter, as described above, can be used in individual serving apparatus, as well as batch serving apparatus, such as coffee brewing systems, which brew a multiple cup volume.

Similar to the flow control device 44 described hereinabove, the device 45 may be positioned in various locations to achieve a desired result. It should be noted that the flow control devices 44, 45 may be used individually, together, or as a means to provide redundant checking of the system. In other words, the system may be operated using a flow control device 44 or a device 45. The system may also be embodied to use both devices 44, 45. Also, the system may be configured and include programming to rely on one of the devices 44, 45 to provide primary information regarding the use of the apparatus 40 with the other of the two devices 44, 45 to provide redundant information to confirm or challenge the primary information to provide redundant information to confirm or challenge the primary information.

In the embodiment which uses a device 45 associated with the product source 34, the dispensing of the product can be monitored by positioning the device on a pump or auger motor used to dispense the product 35. Also, the device 45 can be positioned at the outlet of the product source 34 to monitor the actual outflow. As such, this is another example of the inferential or actual monitoring of the product flow. Furthermore, multiple devices 45 can be placed relative to individual product dispensers of a multiple dispensing apparatus to record the amount and type of each product dispensed.

The system 30 provides communication between the mixing and dispensing apparatus 40 of the system 30 and a data collection portion 52 of the system 30. The data collection portion 52 receives information from the mixing and dispensing apparatus 40 by line 54. As previously discussed with regard to lines 46 and 48, line 54 may be a single, multiple, electrically conductive or optically conductive line, as well as a wireless communication path between the controller 42 and the data collection portion 52.

The controller 42 preferably provides information to the data collection portion 52 including at least the quantity and/or flow rate of the water, product, or both monitored by the flow meter 44 of the dilution source 32 and/or the device 45 of the product source 34. Generally, the controller 42 is in the form of a microprocessor of known construction and includes a memory device. As such, the information may be stored at the controller 42 until accessed or automatically forwarded to the data collection portion 52.

Once the data collection portion 52 has obtained the information from the controller 42, it may be used for a variety of applications. The flow rate information, since it is generally a constant ratio relative to the quantity of product dispensed by the product source 34, may provide information relating to ordering of the product. For example, the information provided by the flow meter 44 or device 45 to the controller 42 can be used to record the flow rate, for quantity, time of day, frequency over various periods of time, as well as type of beverage dispensed. For example, the information may be used to develop maintenance schedules, service schedules, product usage tracking (quantity, type, time of day). This information, or selected portions thereof, is valuable business information which may be studied to determine patterns, trends and other analytical information. This information can also be transmitted to or accessed by a supplier 56 on a regular basis as indicated by line 58. Such information can be used to establish a schedule by which an appropriate quantity of product is automatically delivered to the end user to maintain the apparatus based on the historical accumulated information provided by the controller 42. Communication line 58 may be a two-way communication line such that the data collection portion 52 communicates the ordering requirements to the supplier 56 and the supplier 56 provides confirmation and, perhaps, billing information to the data collection portion 52. The supplier 56 can then provide additional information to the operator of the mixing and dispensing apparatus 40, as well as products as indicated by communication path 60.

The present invention includes a method in which an equipment supplier can provide an end user with a beverage mixing and dispensing apparatus 40. The equipment supplier and end user enter into an arrangement which includes the communication 54 of information from the controller 42 of the apparatus 40 to the data collection portion 52. The information provided to the data collection portion 52 includes at least flow rate information, whether in the form of dilution material flow rate, product flow rate, or both. As noted above, the flow rate may be the actual flow rate or the inferential flow rate. The agreement between the parties will then allow calculation of billing information relating to the flow rate. The sale of product to the user of the apparatus 40, as provided by the supplier 56, can be calculated based on the water flow rate. Under this method, the user of the apparatus 40 would gain little or no advantage by purchasing product from an alternate source since they would be paying for the system, including the product, based on the water usage, product usage, or both calculated as quantity or servings dispensed. If the product is included in the pricing calculation, purchasing a product from an alternate source would be additional cost and, therefore, a disincentive to using any product except that provided by the data collection source 52.

As a result of this method, the data collection source 52 can control the type and quality of the drink 38 produced by the user of the apparatus 40. Additionally, the user of the apparatus 40 would have no incentive to alter the concentration or dilution of the product and, as such, the drink 38 produced by the apparatus 40 would be predictably consistent.

It should be noted that the data collection portion 52 may or may not be located at and/or operated by the original supplier of the apparatus. The data collection portion 52 may actually be a subunit of an entity which purchases and loans such apparatus 40, or manufacturers such apparatus. Additionally, the supplier 56 may be part of the same entity as the data collection portion 52, or may be a separate entity outside of the other entities which produces the product. It should be noted that only a single supplier 56 is shown in FIG. 1, but that multiple suppliers might be used to accommodate the variety of products which might be used in a multiple product apparatus. For example, a system could include a carbonated beverage dispensing point, a coffee beverage dispensing point, a soup drink dispensing point, and a juice beverage dispensing point. As such, multiple suppliers may be needed to provide the multiple product types used in such a system.

With the foregoing in mind, it will also be appreciated that, although a single data collection portion is shown and a single apparatus 40 is shown, it is conceivable that multiple data collection portions 52 and multiple apparatus 40 may be provided. For example, if a franchise entity has multiple apparatus 40 in each of the many multiple locations, a single data collection portion 52 may be dedicated for such a franchise. Additional dedicated data collection portions 52 may be provided for other franchises, as well as other individual non-franchise users.

Figure 2:
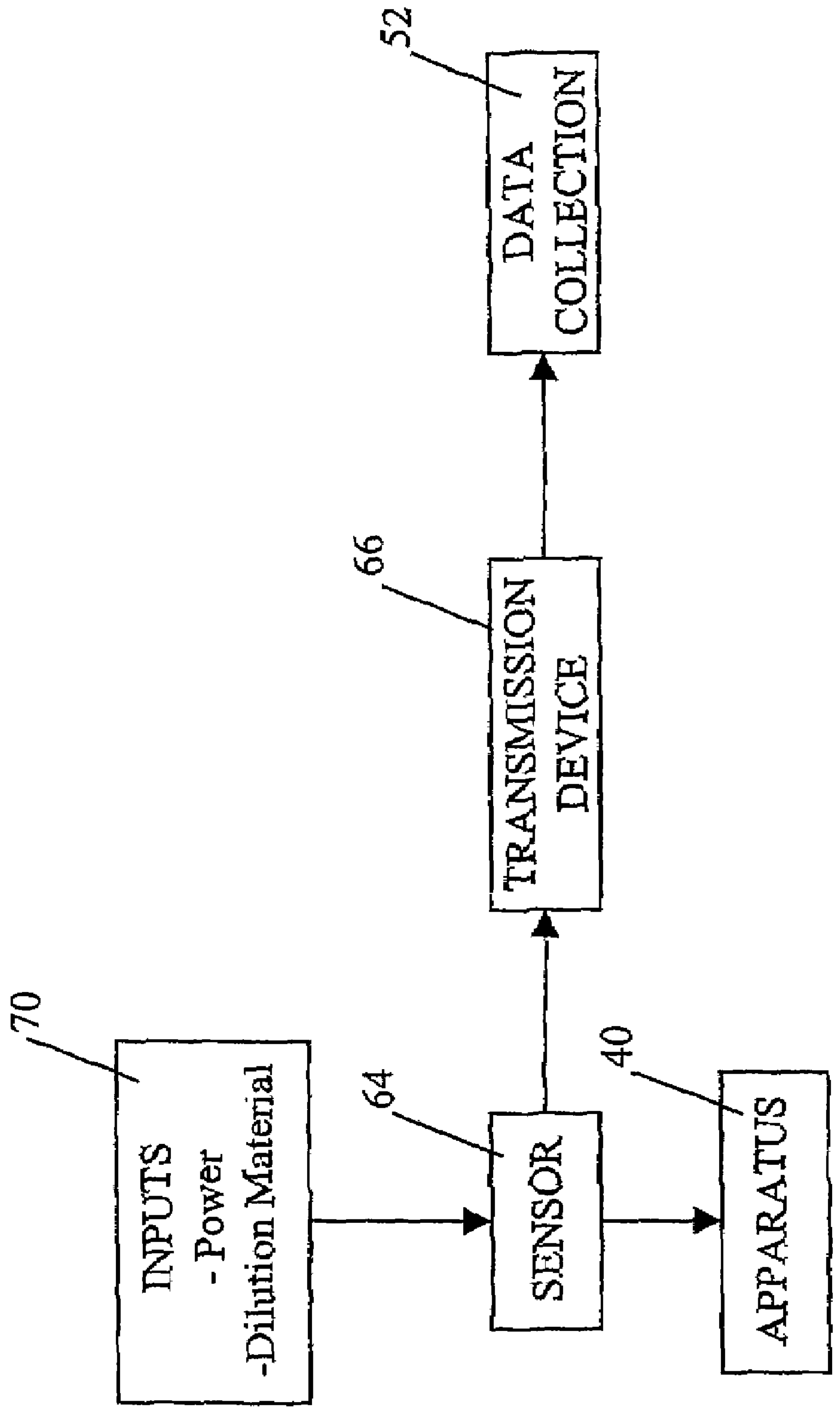
FIG. 2 is a diagrammatic illustration similar to FIG. 1, wherein the apparatus communicates information regarding inputs to the apparatus to the data collection portion.

As shown in FIG. 2, the apparatus 40 and data collector or data collection portion 52 of the system 30 may be configured such that information regarding one or more inputs 70 to the apparatus 40 is provided to the data collection portion 52 using one or more sensors 64 and transmission device 66, and the data collection portion 52 uses the information to monitor the performance of the apparatus 40. Sensor 64 may be a flow meter or a meter to measure characteristics of the input power. Transmission device 66 may include single or multiple line conductors, a modem, and/or wireless communication devices. The information which is provided to the data collection portion 52 regarding the one or more inputs 70 to the equipment 40 may be associated with one or more components of the equipment and, depending on the nature of the component(s) being monitored, may include information relating to voltage (V), current (I), phase angle (Ø) and/or time (T). For example, if a purely resistive component, such as a heater 62, is being monitored, it is sufficient to monitor V and I. On the other hand, if a component with some inductance, such as a solenoid 65, is being monitored, phase angle (Ø) and time (T) may need to monitored. Furthermore, it is possible to monitor the number of times the solenoid 65 is activated, and calculate the total amount of dilution material which is used over a a predetermined period of time (if the assumption is made that a predetermined volume of dilution material is user per solenoid operation). Regardless of what exactly is monitored, being able to remotely monitor an apparatus 40, such as a beverage brewer, preferably avoids the cost and complexity of adding internal components, wiring and plumbing to every apparatus produced in order to monitor the performance thereof.

The data collection portion 52 may be configured to monitor an apparatus 40 which is not specifically designed for monitoring. Alternatively, the apparatus 40 may be specifically configured to facilitate the monitoring by the data collection portion 52. For example, the apparatus 40 may be configured to momentarily turn off one device in the apparatus, such as a tank heater, while another device, such as a solenoid, is turned on. This permits more precise and accurate monitoring by the monitoring equipment (i.e., the data collection portion 52). Precision and accuracy of monitoring is increased because the relatively small solenoid current would not be hidden or masked by the presence of a large tank heater current. In other words, the characteristic being monitored, in this example current, is monitored in the absence of other, potentially confusing characteristics.

As discussed, the information provided to the data collection portion 52 may relate to voltage (V), current (I), phase angle (Ø), and time (T) or other monitorable characteristics. Because at least one of the inputs 70 measured by the data collection portion 52 could be current, information could be communicated to the data collector by pulsing the current in a predetermined code. For instance, if the controller 42 of the apparatus 40 determined that the time it took to reheat after a brewing cycle was extensive, the controller 42 could be configured to pulse a solenoid in a coded sequence. This would signal the condition to create a fault alert or flag.

By providing that the information provided to the data collector relates to voltage (V), current (I), phase angle (Ø), and time (T), many different aspects of the functioning of the apparatus 40 can be monitored. For example, energy consumption can be monitored by measuring V, I, Ø and T, the activation of various loads within the apparatus can be monitored by measuring V, I and Ø and it can be determined by measuring V and I whether one or more loads in the apparatus 40 are within accepted limits.

Figure 3:
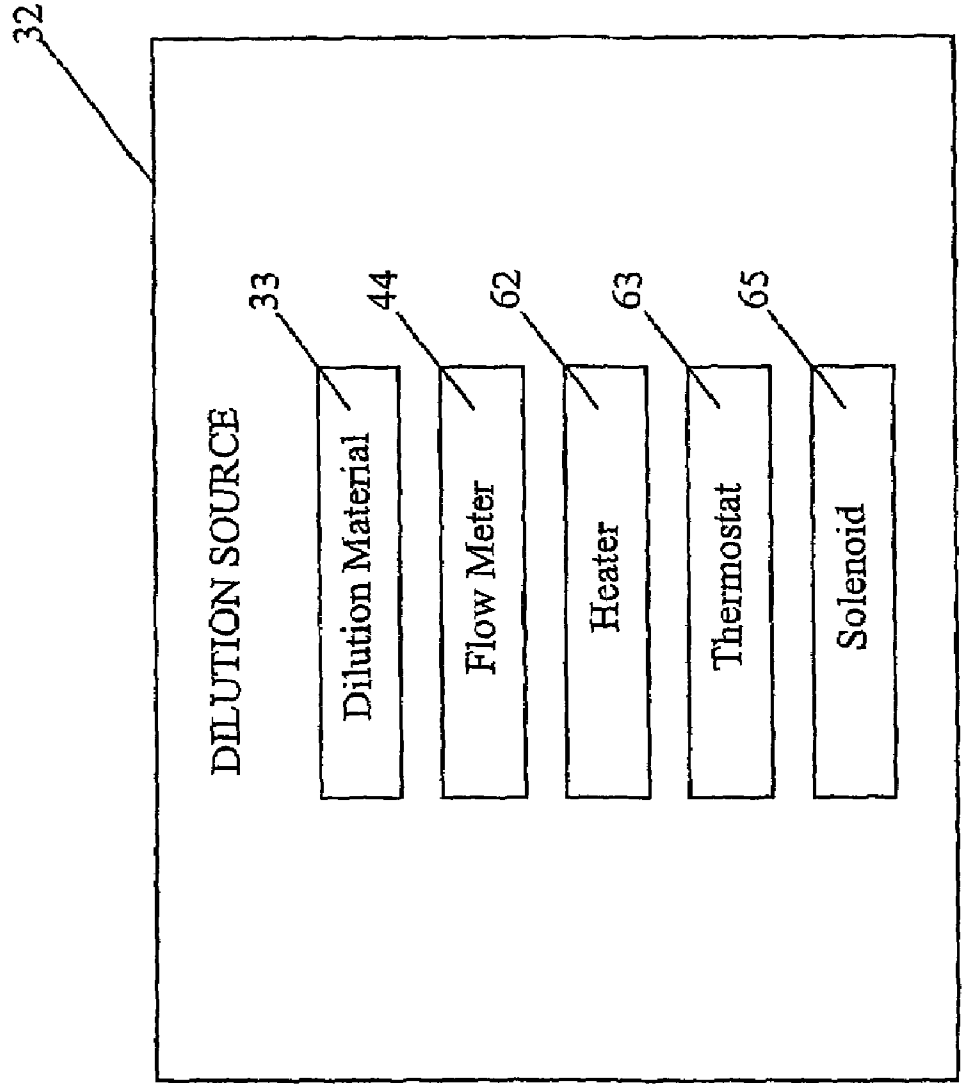
FIG. 3 is a diagrammatic illustration of the dilution source of FIG. 1.

Additionally, the amount of dilution material, such as water, used by the apparatus can be determined by the data collection portion 52 in at least the following two ways: 1) because one gram of water increases in temperature by one degree centigrade for one calorie of added heat, water used by the apparatus 40 can be determined by measuring V, I and T, wherein ending temperature is set by a thermostat 63 (FIG. 3) in the apparatus 40, and beginning temperature can be estimated or measured by the monitoring equipment (i.e., the data collection portion 52) since water is another input which can be monitored; 2) by measuring Ø and T —wherein Ø is zero (i.e., all loads in the apparatus 40 are resistive) except when a solenoid 65 (FIG. 3) in the apparatus 40 is turned on. If the apparatus 40 employs a flow regulator, valve on-time multiplied by flow rate will determine total volume. For a 240 volt apparatus, another way of determining solenoid valve on-time is to measure the current in the neutral wire at the power source, wherein the solenoid is a 120 volt device connected between one line and neutral. As discussed above, it is possible to monitor the number of times a solenoid is activated, and then calculate the total amount of dilution material which is used over a given period of time (if the assumption is made that given volume of dilution material is user per solenoid operation).

Still further, the volume of water or other type of dilution material consumed by the apparatus 40 can be monitored by measuring water input using a flow meter and reporting the measurement to the data collection portion 52. Usage patterns can also be monitored by measuring I and keeping track of the time of day. Information about usage pattern is useful in determining if an apparatus has the ultimate capacity for its location.

Remotely monitoring the apparatus allows the equipment supplier to evaluate the performance of the apparatus. As such, the supplier can become aware of malfunctions in the equipment as early as possible so that the problem can be corrected quickly, thereby minimizing the amount of downtime and preventing the machine from possibly becoming permanently damaged. Additionally, the information received, such as information relating to the amount of dilution material, such as water, or the amount of product used by the apparatus, may be used to bill the end user, as described in detail above in connection with FIG. 1. The results of the monitoring can be used for still other purposes, such as, the timing of delivery of product, detecting operating anomilies, planning and scheduling maintenance, as well as other purposes.

While aspects of the present invention are shown and described, it is envisioned that those skilled in the art may devise various modifications of the present invention without departing from the spirit and scope of the foregoing description.

What is claimed is:

1. A method of monitoring a beverage preparation device, comprising the steps of: measuring at least one input into the beverage preparation device; and determining information about the performance of the beverage preparation device based on the measured input.

2. The method of claim 1, wherein the step of determining information includes determining an estimate of a volume of dilution material used by the beverage preparation device.

3. The method of claim 2, wherein the measured input is at least one of voltage, current, phase angle, and time.

4. The method of claim 1, wherein the measured input is a volume of dilution material used by the beverage preparation device.

5. The method of claim 1, further comprising a step of transmitting the measured input to a remote location prior to the step of determining information.

6. The method of claim 1, wherein the step of determining information includes determining a usage pattern.

7. The method of claim 1, further comprising the step of billing the user of the device based on the determined information.

8. A system for monitoring the performance of beverage preparation equipment comprising: a sensor for measuring at least one input to the beverage preparation equipment; a data collector; and a means for transmitting the measured input to the data collector, the data collector determining information regarding the performance of the beverage preparation equipment using the measured input.

9. The system of claim 8, further comprising means for providing access to the performance information to at least one supplier associated with the beverage preparation equipment.

10. The system of claim 8, wherein the beverage preparation equipment uses a dilution material and the data collector determines an estimate of the volume of dilution material used by the beverage preparation equipment.

11. The system of claim 10, wherein the input to the beverage preparation equipment is electrical power and the sensor measures at least one of voltage, current, phase, and time of the power into the beverage preparation equipment.

12. The system of claim 8, wherein the input to the beverage preparation equipment is dilution material and the sensor measures a volume of dilution material used by the beverage preparation equipment.

13. A beverage preparation apparatus comprising: at least one dilution source providing a dilution material; at least one product source providing a product; at least one sensor providing data regarding at least one of the dilution material and the product; a controller connected to the sensor and configured to transmit the data externally of the apparatus; and a data collector externally receiving the data transmitted by the controller and determining performance information of the beverage preparation apparatus.

14. The apparatus of claim 13, wherein the product source includes a device to measure the amount of product dispensed.

15. The apparatus of claim 13, wherein at least one of the dilution source and product source includes a flow meter.

16. The apparatus of claim 13, wherein the data collector includes a communication device to transmit the performance information to a supplier.

17. A method of operating beverage preparation equipment comprising the steps of: providing beverage preparation equipment to an end user, the beverage preparation equipment including a sensor; continuously monitoring data from the sensor; determining information about the performance of the beverage preparation equipment using the data from the sensor; and performing a function related to the beverage preparation equipment based on the information about the performance of the beverage preparation equipment.

18. The method of claim 17, wherein the step of performing a function includes billing the end user.

19. The method of claim 17, wherein the step of performing a function includes maintaining the beverage preparation equipment.

20. The method of claim 17, wherein the step of performing a function includes providing additional product to the end user.

21. The method of claim 17, wherein the beverage preparation equipment includes a dilution source having dilution material and the step of determining information includes determining the amount of dilution material used by the beverage preparation equipment.

22. The method of claim 17, wherein the beverage preparation equipment includes a product source having product and the step of determining information includes determining the amount of product used by the beverage preparation equipment.

23. The method of claim 17, wherein the beverage preparation equipment includes a dilution source having dilution material, a heater, and a thermostat; the sensor measuring the voltage at and the current through the heater; the thermostat measuring the temperature of the dilution material; and the step of determining information includes determining an estimate of the volume of dilution material used by the beverage preparation equipment.

24. The method of claim 17, further comprising the step of transmitting the information to at least one supplier of goods for the beverage preparation equipment.

25. A method of monitoring a beverage preparation device, comprising the steps of:

measuring at least one input into the beverage preparation device; and determining information about the performance of the beverage preparation device based on the measured input, wherein the step of determining information includes determining a usage pattern.

26. A method of operating beverage preparation equipment comprising the steps of:

providing beverage preparation equipment to an end user, the beverage preparation equipment including a sensor;

continuously monitoring data from the sensor;

determining information about the performance of the beverage preparation equipment using the data from the sensor; and performing a function related to the beverage preparation equipment based on the information about the performance of the beverage preparation equipment, wherein the step of performing a function includes providing additional product to the end user.

27. A method of operating beverage preparation equipment comprising the steps of:

providing beverage preparation equipment to an end user, the beverage preparation equipment including a sensor;

continuously monitoring data from the sensor;

determining information about the performance of the beverage preparation equipment using the data from the sensor;

transmitting the information to at least one supplier of goods for the beverage preparation equipment; and performing a function related to the beverage preparation equipment based on the information about the performance of the beverage preparation equipment.

28. A method of operating beverage preparation equipment comprising the steps of:

providing beverage preparation equipment to an end user, the beverage preparation equipment including at least one sensor;

monitoring data from the at least one sensor;

determining information about the performance of the beverage preparation equipment using the data from the at least one sensor; and performing a function related to the beverage preparation equipment based on the information about the performance of the beverage preparation equipment, wherein the step of performing a function includes monitoring the beverage preparation equipment for maintenance of one or more device in the beverage preparation equipment.

29. The method of claim 28, further comprising the step of scheduling maintenance of the beverage preparation equipment in response to monitoring the one or more device in the beverage preparation equipment.

30. The method of claim 28, further comprising the step of providing repair of the beverage preparation equipment in response to monitoring the one or more device in the beverage preparation equipment.

31. The method of claim 28, further comprising the step of monitoring one of at least one of voltage, current, phase angle, and time associated with one or more device of the beverage preparation equipment.

32. The method of claim 28, further comprising the steps of:

providing a dilution source having dilution material; and determining information includes determining the amount of dilution material used by the beverage preparation equipment.

33. The method of claim 32, further comprising the steps of:

providing at least one sensor; and using the at least one sensor for determining the amount of dilution material used by the beverage preparation equipment.

34. A method of operating beverage preparation equipment comprising the steps of:

providing beverage preparation equipment;

providing at least one sensor operatively associated with the beverage preparation equipment;

monitoring data from the at least one sensor;

determining information about the performance of the beverage preparation equipment using the data from the at least one sensor;

performing a function related to the beverage preparation equipment based on the information about the performance of the beverage preparation equipment wherein the function is accumulating information relating to the beverage performance of the beverage preparation equipment.

35. The method of claim 34, wherein information is accumulated for monitoring usage patterns associated with the beverage preparation equipment.

36. The method of claim 34, further comprising the step of applying usage patterns for delivery of product.

37. The method of claim 34, further comprising the step of applying usage patterns for detecting anomalies.

38. The method of claim 34, further comprising the step of applying usage patterns for detecting malfunctions.

39. The method of claim 34, further comprising the step of applying usage patterns for monitoring the amount of dilution material used.

40. The method of claim 34, further comprising the step of applying usage patterns for planning maintenance.

41. The method of claim 34, further comprising the step of applying usage patterns for scheduling maintenance.

42. The method of claim 34, further comprising the step of monitoring one of at least one of voltage, current, phase angle, and time associated with one or more device of the beverage preparation equipment.

43. A method of monitoring at least one device of beverage preparation equipment, the method comprising the steps of:

measuring at least one input into the at least one device, the input is a monitorable characteristic associated with the operation of the at least one device; and determining information about the performance of the beverage preparation equipment based on the measured input.

44. The method of claim 43, further comprising the monitorable characteristic is at least one of voltage, current, phase angle, and time associated with the at least one device of the beverage preparation equipment.

45. A method of claim 43, further comprising the step of using the information for scheduling maintenance of the beverage preparation equipment.

46. A method of claim 43, further comprising the step of using the information for providing repair of the beverage preparation equipment.

47. The method of claim 43, further comprising the steps of:

providing a dilution source having dilution material; and using information includes determining the amount of dilution material used by the beverage preparation equipment.

48. The method of claim 43, further comprising the steps of:

providing at least one sensor; and using the at least one sensor for determining the amount of dilution material used by the beverage preparation equipment.

* * * * *